US008090928B2

(12) United States Patent
Schmidt et al.

(10) Patent No.: US 8,090,928 B2
(45) Date of Patent: Jan. 3, 2012

(54) METHODS AND APPARATUS FOR PROCESSING SCALAR AND VECTOR INSTRUCTIONS (75) Inventors: Dominik J. Schmidt, Stanford, CA (US); Robert Warren Sherburne, Jr., Kentfield, CA (US)

(73) Assignee: Intellectual Ventures I LLC, Wilmington, DE (US)

( * ) Notice: Subject to any disclaimer, the term of this patent is extended or adjusted under 35 U.S.C. 154(b) by 833 days.

(21) Appl. No.: 10/184,402

(22) Filed: Jun. 28, 2002

(65) Prior Publication Data

US 2004/0142717 A1     Jul. 22, 2004

(51) Int. Cl.
G06F 15/76 (2006.01)
(52) U.S. Cl. .......................................................... 712/3
(58) Field of Classification Search .................. 455/419; 370/347; 712/22, 3
See application file for complete search history.

(56) References Cited

U.S. PATENT DOCUMENTS

| | | | |
|---|---|---|---|
| 4,653,068 A | 3/1987 | Kadin | |
| 5,175,862 A * | 12/1992 | Phelps et al. .................. 712/7 |
| 5,384,826 A | 1/1995 | Amitay | |
| 5,619,399 A | 4/1997 | Mok ............................... 361/707 |
| 5,623,159 A * | 4/1997 | Monk et al. .................... 257/509 |
| 5,640,399 A | 6/1997 | Rostoker et al. | |
| 5,649,001 A | 7/1997 | Thomas et al. | |
| 5,706,004 A * | 1/1998 | Yeung ............................ 341/122 |
| 5,784,636 A * | 7/1998 | Rupp .............................. 712/37 |
| 5,805,875 A * | 9/1998 | Asanovic ....................... 712/222 |
| 5,898,892 A * | 4/1999 | Gulick et al. .................. 710/52 |
| 5,923,702 A | 7/1999 | Brenner et al. | |
| 5,943,290 A * | 8/1999 | Robinson et al. ............. 365/233 |
| 5,949,775 A | 9/1999 | Rautiola et al. | |
| 5,966,598 A * | 10/1999 | Yamazaki ...................... 438/221 |
| 5,974,463 A | 10/1999 | Warrier et al. | |
| 6,096,091 A | 8/2000 | Hartmann ...................... 716/17 |
| 6,119,179 A | 9/2000 | Whitridge et al. | |
| 6,275,838 B1 * | 8/2001 | Blomgren et al. ............. 708/501 |
| 6,317,819 B1 * | 11/2001 | Morton ........................... 712/22 |
| 6,321,318 B1 * | 11/2001 | Baltz et al. .................... 711/170 |
| 6,366,622 B1 | 4/2002 | Brown et al. .................. 375/322 |
| 6,400,928 B1 | 6/2002 | Kullar et al. .................. 455/67.11 |
| 6,405,027 B1 | 6/2002 | Bell ............................... 455/403 |
| 6,441,442 B1 | 8/2002 | Wong ............................. 257/371 |
| 6,442,672 B1 * | 8/2002 | Ganapathy ..................... 712/201 |
| 6,535,939 B1 * | 3/2003 | Arimilli et al. ................ 710/116 |
| 6,603,915 B2 | 8/2003 | Glebov et al. ................ 385/129 |
| 6,631,259 B2 | 10/2003 | Pecen et al. ................... 370/314 |
| 6,665,774 B2 * | 12/2003 | Faanes et al. ................. 711/118 |
| 6,742,012 B2 * | 5/2004 | Nancekievill ................. 708/625 |
| 6,763,444 B2 * | 7/2004 | Thomann et al. ............. 711/170 |
| 6,839,828 B2 * | 1/2005 | Gschwind et al. ............ 712/20 |
| 6,901,502 B2 * | 5/2005 | Yano et al. .................... 712/37 |
| 6,977,977 B1 * | 12/2005 | Dubrovin et al. ............. 375/346 |

(Continued)

OTHER PUBLICATIONS

Kneip et al. "Single Chip Programmable Baseband ASSP for 5 GHz Wireless LAN Applications." IEICE Trans. Electron., vol. E85-C, No. 2. Feb. 2002. pp. 359-367.*

(Continued)

*Primary Examiner* — Jacob A Petranek (57) ABSTRACT

In one embodiment of the present invention, a processor includes a scalar computation unit; a vector co-processor coupled to the scalar computation unit; and one or more function-specific engines coupled to the scalar computation unit, where the engines are adapted to minimize data exchange penalties by processing small in-out bit slices.

22 Claims, 4 Drawing Sheets

U.S. PATENT DOCUMENTS

| | | | |
|---|---|---|---|
| 7,028,145 B1 * | 4/2006 | Chauvel et al. | 711/147 |
| 7,031,668 B2 * | 4/2006 | Darabi et al. | 455/75 |
| 7,187,663 B2 * | 3/2007 | Schmidt | 370/313 |
| 2001/0034227 A1 * | 10/2001 | Subramanian et al. | 455/419 |
| 2001/0054060 A1 * | 12/2001 | Fillebrown et al. | 709/201 |
| 2002/0015401 A1 * | 2/2002 | Subramanian et al. | 370/347 |
| 2002/0031166 A1 * | 3/2002 | Subramanian et al. | 375/130 |
| 2002/0059434 A1 | 5/2002 | Karaoguz et al. | 709/228 |
| 2002/0197998 A1 | 12/2002 | Schmidt | 455/452 |
| 2003/0035388 A1 | 2/2003 | Schmidt | 370/329 |
| 2003/0058830 A1 | 3/2003 | Schmidt | 370/347 |
| 2004/0243866 A1 | 12/2004 | Sherburne, Jr. | 713/320 |

OTHER PUBLICATIONS

Grass et al. "On the Single-Chip Implementation of a Hiperlan/2 and IEEE 802.11a Capable Modem." IEEE Personal Communications. Dec. 2001. pp. 48-57.*

White, Ron. "How Computers Work." Que Corporation. 6th Edition, 2002. p. 9.*

* cited by examiner

METHODS AND APPARATUS FOR PROCESSING SCALAR AND VECTOR INSTRUCTIONS

BACKGROUND

The present invention relates to a flexible processing system.

Advances in computer technology have provided high performance, miniaturized computers that are inexpensive. Even with these impressive achievements, manufacturers are constantly looking for improvements in areas such as user-friendliness and connectivity so that users can be productive any time anywhere. Wireless communications networks offer the user such capabilities. However, the speed and computational robustness of present-day wireless communications systems leave much to be desired.

In response, the industry is adopting new technologies such as 802.11A, GPRS and EDGE wireless networking technologies that drive transparent connections between all computing, communications, audio and video devices. 802.11A transceivers communicate at the 5 GHz frequency and offer 100 Mbps throughput, in contrast to the 2.4 GHz frequency and the 11 Mbps throughput of 802.11B transceivers.

General Packet Radio Service (GPRS) brings packet data connectivity to the Global System for Mobile Communications (GSM) market. GPRS integrates GSM and Internet Protocol (IP) technologies and is a bearer for different types of wireless data applications with bursty data, especially WAP-based information retrieval and database access. GPRS packet-switched data technology makes efficient use of radio and network resources. Session set-up is nearly instantaneous, while higher bit rates enable convenient personal and business applications. Consequently, GPRS not only makes wireless applications more usable, but also opens up a variety of new applications in personal messaging and wireless corporate intranet access.

EDGE stands for Enhanced Data rates for Global Evolution. EDGE is the result of a joint effort between TDMA operators, vendors and carriers and the GSM Alliance to develop a common set of third generation wireless standards that support high-speed modulation. EDGE is a major component in the UWC-136 standard that TDMA carriers have proposed as their third-generation standard of choice. Using existing infrastructure, EDGE technology enables data transmission speeds of up to 384 kilobits per second.

The new standards such as 802.11A, EDGE and GPRS achieve increased transmission throughput by using complex digital signal processing algorithms, many of which require high processing power exceeding that offered by today's baseband processors.

One way to increase processing power is to perform computations in parallel using hardwired, dedicated processors that are optimized for one particular radio frequency (RF) protocol. Although highly effective when geared to handle one RF protocol, this approach is relatively inflexible and cannot be easily switched to handle today's multi-mode cellular telephones that need to communicate with a plurality of RF protocols.

Another way to increase processing power is to perform computations in parallel using general-purpose processors. Although flexible in programmability, such an approach may not provide the highest possible computational power that may be needed when performing digital signal processing for specific wireless applications such as 802.11A or GPRS applications.

Yet another approach uses reconfigurable logic computer architectures that include an array of programmable logic and programmable interconnect elements. The elements can be configured and reconfigured by the end user to implement a wide range of logic functions and digital circuits and to implement custom algorithm-specific circuits that accelerate the execution of the algorithm. High levels of performance are achieved because the gate-level customizations made possible with FPGAs results in an extremely efficient circuit organization that uses customized data-paths and "hardwired" control structures. These circuits exhibit significant fine-grained, gate-level parallelism that is not achievable with programmable, instruction-based technologies such as microprocessors or supercomputers. This makes such architectures especially well suited to applications requiring the execution of multiple computations during the processing of a large amount of data. A basic reconfigurable system consists of two elements: a reconfigurable circuit resource of sufficient size and complexity, and a library of circuit descriptions (configurations) that can be down-loaded into the resource to configure it. The reconfigurable resource would consist of a uniform array of orthogonal logic elements (general-purpose elements with no fixed functionality) that would be capable of being configured to implement any desired digital function. The configuration library would contain the basic logic and interconnect primitives that could be used to create larger and more complex circuit descriptions. The circuit descriptions in the library could also include more complex structures such as counters, multiplexers, small memories, and even structures such as controllers, large memories and microcontroller cores. For example, U.S. Pat. No. 5,784,636 to Rupp on Jul. 21, 1998 discusses a reconfigurable processor architecture using a programmable logic structure called an Adaptive Logic Processor (ALP). The Rupp structure is similar to an extendible field programmable gate array (FPGA) and is optimized for the implementation of program specific pipeline functions, where the function may be changed any number of times during the progress of a computation. A Reconfigurable Pipeline Instruction Control (RPIC) unit is used for loading the pipeline functions into the ALP during the configuration process and coordinating the operations of the ALP with other information processing structures, such as memory, I/O devices, and arithmetic processing units. Multiple components having the Rupp reconfigurable architecture may be combined to produce high performance parallel processing systems based on the Single Instruction Multiple Data (SIMD) architecture concept.

SUMMARY

A processor includes a scalar computation unit; a vector co-processor coupled to the scalar computation unit; and one or more function-specific engines coupled to the scalar computation unit, the engines adapted to minimize data exchange penalties by processing small in-out bit slices.

Implementations of the system may include one or more of the following. The hardware blocks have their own local memory and rely on the scalar processor only for configuration and parametric settings at the beginning of each computation sequence. The vector co-processor performs computationally intensive operations, as 'functions' within the software algorithm implementation. The hardware blocks act as subroutines, expanding the data flow locally to achieve high throughput without a large bus-capacitance penalty. The frequency of the hardware and processor can be scaled from baseline crystal frequency to a maximum operating frequency. Each hardware block has a synchronized switch ("synchronization switch"), such that it can be turned off without affecting the delay to the other blocks. The switch adds an identical delay whether or not the hardware block is on or not. A flexible analog interface can provide a varying bit-width and sampling frequency. The analog interface also handles variable filtering, DC offset compensation and I/Q mismatch compensation, such that the processing load can be shared among the digital and analog elements. This allows the use of direct-conversion radios as well as the more traditional super-heterodyne radios. The specific hardware subroutines can be re-used from protocol to protocol by changing the input parameters and the clock frequency.

Advantages of the system may include one or more of the following. The system uses a RISC-like architecture with a vector co-processor and an extensive library of engines or function-specific hardware blocks. The engines perform vector operations, but they are not generic arithmetic units. Rather, they aggregate several specific multiply, add, compares to perform a high level function such as the FFT. This is advantageous because the RISC controller can be used to write simple control software in ANSI-C without the need for complex DSP or VLIW languages, and the engine or hardware blocks can be turned on and off as simple subroutines within embedded code. The RISC controller can also run upper layer protocol stacks. This allows for hardware re-use, since the same processor will process initial packet data and also provide the necessary configuration parameters to the vector processor.

Most of the implementation is in hardware, which has the highest computing power density (MIPS/mW/cm2). The RISC engine is small, and the Vector co-processor is also small. By implementing many of the instructions and subroutines in hardware, code size can be limited, thereby reducing the embedded SRAM instruction memory. New protocols can be implemented by adding new hardware accelerator blocks (RAKE, correlator etc) and simply scaling the process generation (milliwatts/Megahertz). The system's bus-less design gives significant power savings since the bus capacitance does not need to switch with every cycle.

A high performance, low overhead system for wireless communication system expanding the functionality and capabilities of a computer system is provided. The system effectively combines multiple components required to implement cellular radio, 802.11A and/or Bluetooth™ into a single integrated circuit-device. The complete integration of components greatly reduces manufacturing costs. Another benefit is the fact that a single chip solution results in much lower communication overhead, in comparison to prior art multiple chip card system. The system provides for fast, easy migration of existing designs to high performance, high efficiency single chip solutions. Many elements of the LAN and WAN architecture are the same and can be re-used. For example, the Gaussian filter is used both in GSM communication and in Bluetooth communication. Similarly, the MLSE decoder and convolutional decoder are present in almost every wireless protocol, so they can be used without resource duplication. The system provides a combination of software/DSP/ASIC resources that are globally and transparently 'alterable' and that can be scaled to provide vast processing power to handle the requirements of RF digital signal processing.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
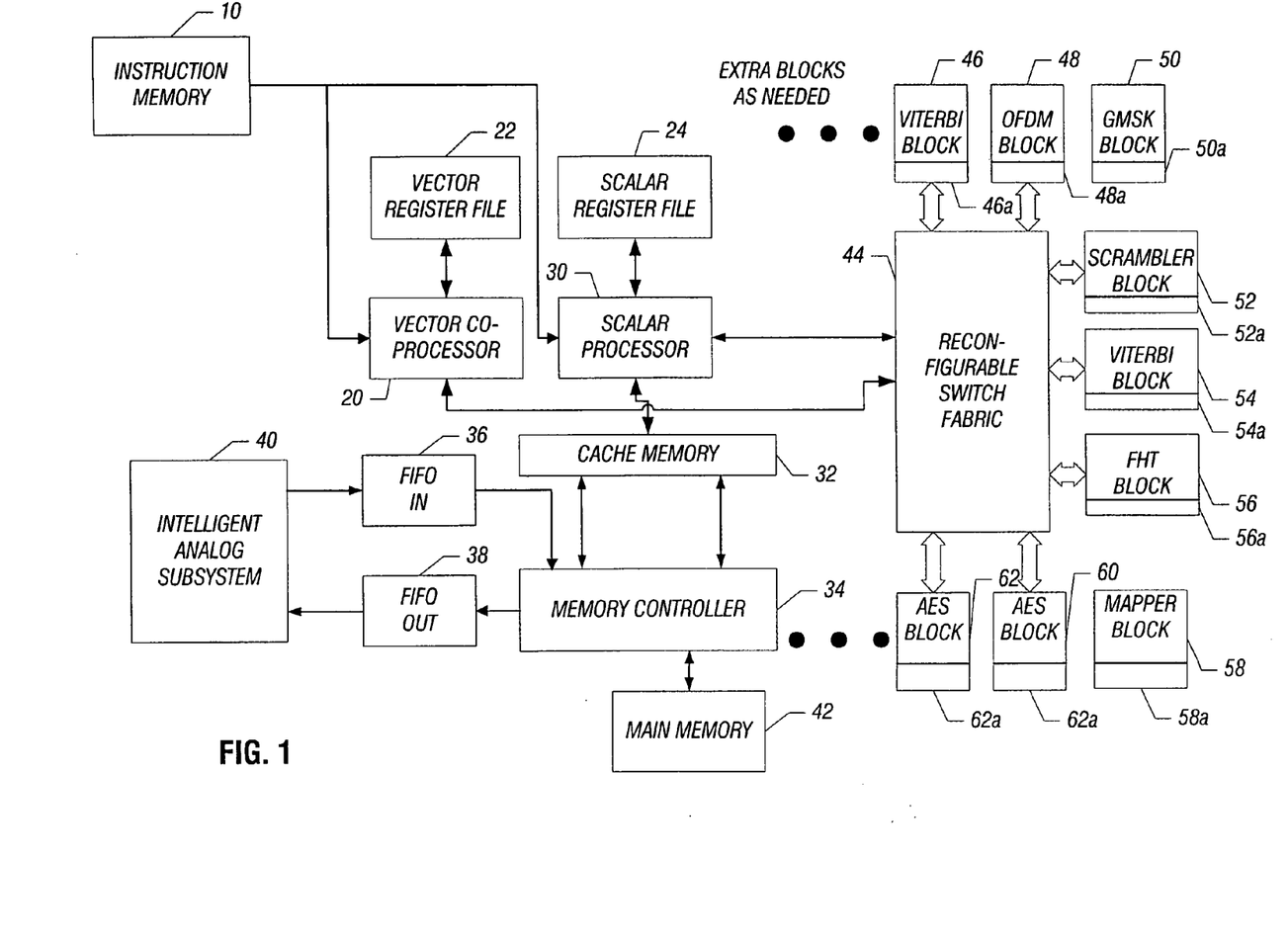
FIG. 1 is a block diagram of a single chip processor.

FIG. 1 shows a block diagram of a processing system to support a multi-mode wireless communicator device is shown. The processing system includes a scalar computation unit, a vector co-processor coupled to the scalar computation unit; and one or more function-specific engines coupled to the scalar computation unit and the vector co-processor. The function-specific engines are adapted to minimize data exchange penalties by processing small in-out bit slices. In the processing system, an instruction memory 10 communicates with a vector co-processor 20. Vector co-processor 20 receives data from a vector register file 22. The vector processor 20 also communicates with a Reconfigurable Switch Fabric 44. Also in communication with the Reconfigurable Switch Fabric 44 is a Scalar Processor 30. The Scalar Processor 30 receives instructions from the Instruction Memory 10 and a Scalar Vector Register File 24. The Scalar Processor 30, Vector Co-processor 20 and Reconfigurable Switch Fabric 44 communicate with a Cache Memory 32, which in turn communicates with a Memory Controller 34. The Memory Controller writes to a Buffer 38, which can be a FIFO output buffer. The Memory Controller 34 also receives inputs from a buffer 36 such as a FIFO input. The FIFO input 36 and FIFO output 38 communicates with an intelligent analog subsystem 40. The Memory Controller 34 in turn controls a DRAM main memory 42.

In accordance with the present invention, the processing system of FIG. 1 that supports a multi-mode wireless communicator device can include an analog portion integrated on the substrate (e.g. the intelligent analog subsystem 40). The analog portion can include a radio frequency (RF) front-end adapted to receive an RF signal from an antenna, and an analog to digital converter (ADC) coupled to the RF front-end to digitize the RF signal.

The Reconfigurable Switch Fabric 44 also communicates with a plurality of functions specific blocks. For example, the Reconfigurable Switch Fabric communicates with a Viterbi Block 46, OFDM Block 48, and GMSK Block 50, Scrambler Block 52, Viterbi Block 54, FHT Block 56, Maper Block 58, CRC Block 60, and AES Block 62. Each of the function specific blocks includes its own synchronized switch, respectively switches 46a, 48a, 50a, 52a, 54a, 56a, 58a, 60a, and 62a.

Figure 2:
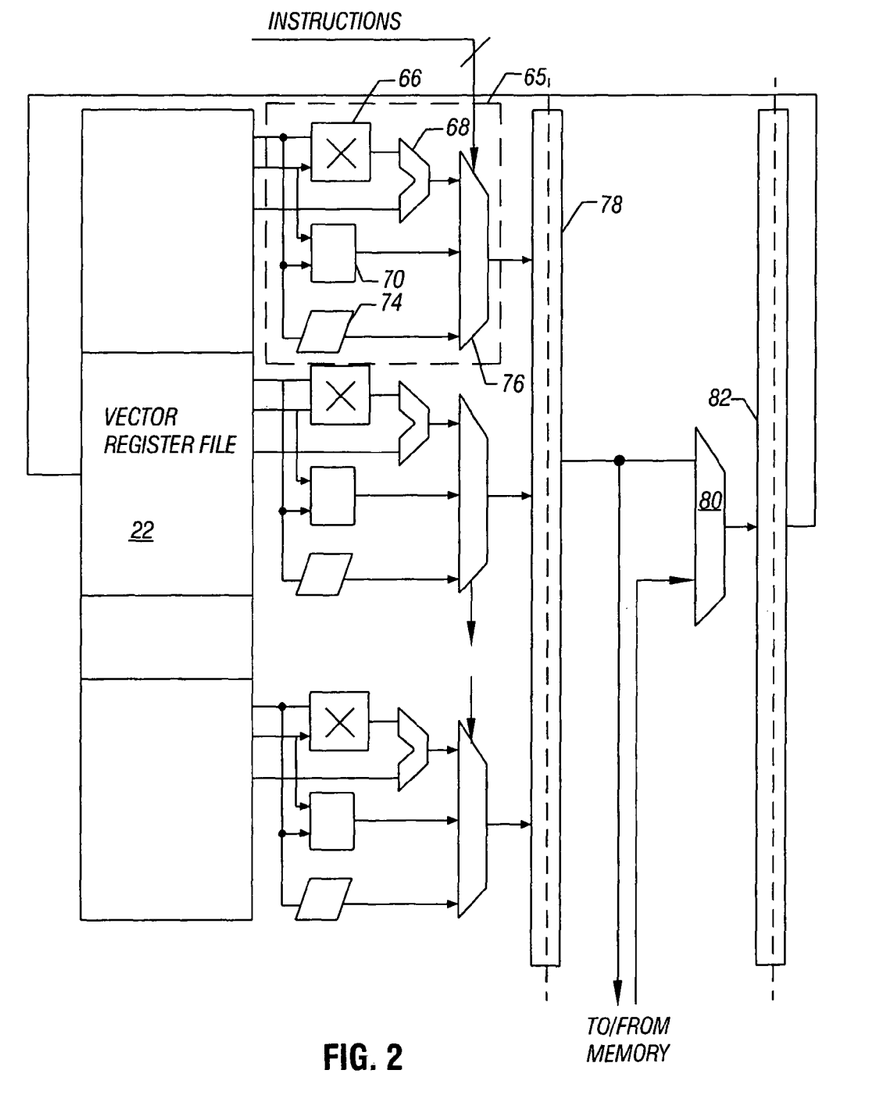
FIG. 2 is an exemplary vector engine of the processor.

Referring on to FIG. 2, an exemplary implementation of the Vector Processor 20 of FIG. 1 is detailed. The Vector Processor 20 includes a Vector Register File 22. Further, the Vector Register File 22 communicates with a plurality of Blocks 65. Block 65 includes a multiplier 66 which communicates with an accumulator 68. The accumulator 68 also receives data from the Vector Register File 22. The operative of the accumulator 68 is provided to a multiplexor 76. One input to the multiplexor 76 is a Logic Operation Block 70 another input to the multiplexor 76 is a Shifter 74. The multiplexor 76 in term communicates with a Cross Bar 78 which communicates to a multiplexor 80 and which in turn communicates to a Second Cross Bar 82.

Figure 3:
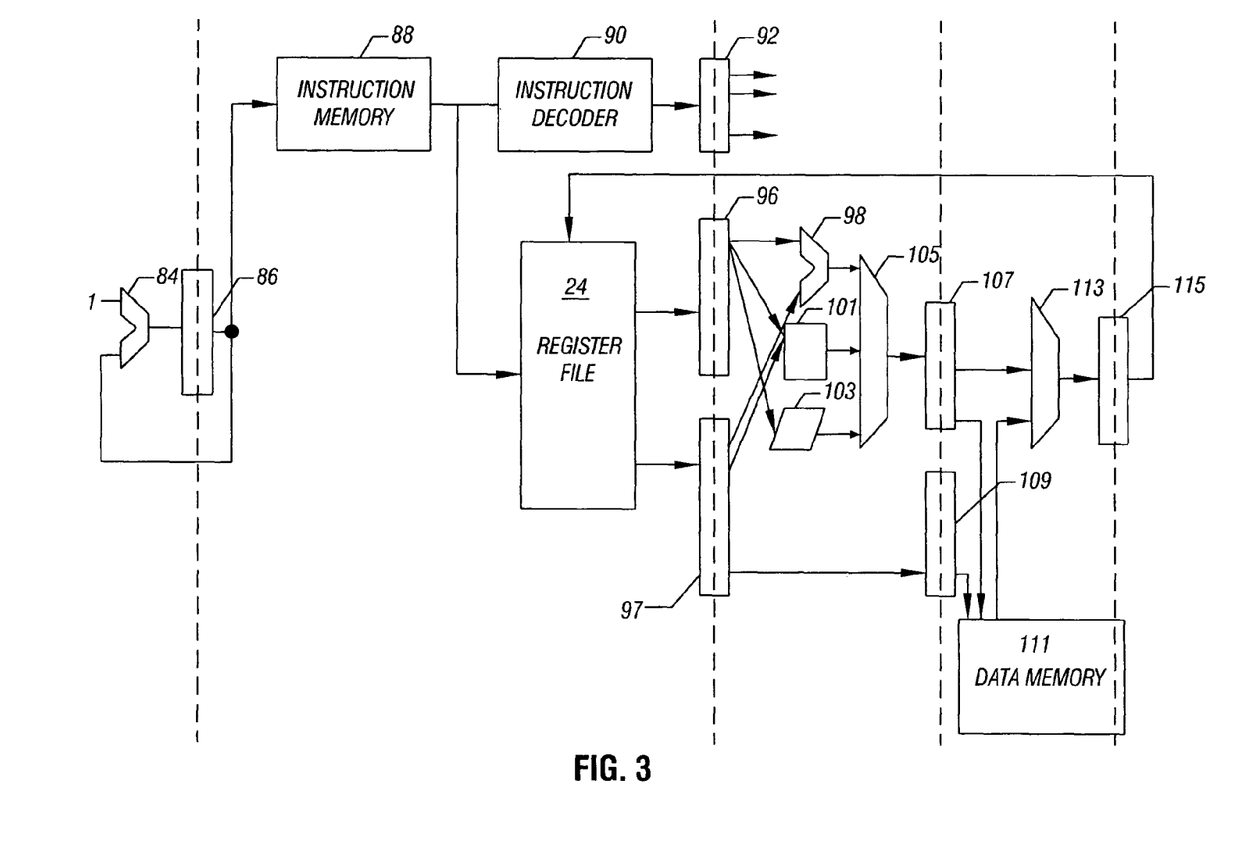
FIG. 3 is an exemplary scalar engine of the processor.

Referring on to FIG. 3, an embodiment of the Scalar Processor 30 is detailed. In this embodiment, an adder 84 receives data from a program counter register (PCR) 86. The PCR 86 communicates with an Instruction Memory Block 88. The Instruction Memory also communicates with a an Instruction Decoder 90 whose output is provided to a decoder 92. The Instruction Memory 88 also communicates with a Register File 24 whose output is provided to a Buffer 96 and 97. The output of the buffers 96 and 97 are provided to a Multiplier 98, Logic Operation Block 101 and Shifter 103, respectively. The output of the Multiplier 98, Logic Operation Block 101 and Shifter 103 are provided to a Multiplexor 105, which in turn drives a buffer Block 107 and 109. Blocks 107 and 109 in turn communicate with a Data Memory Block 111. Blocks 107, 109 and Data Memory 111 also communicates with a Multiplexor 113, which in turn communicates with a Buffer 115 whose output is looped back to the Register File 24.

The scalar processor is used for flow control. The vector processor is used for parallel computation of vector operations. Applications of vector operations are DCT, FFT, convolution, FIR filtering, etc. At every cycle the processor will fetch a new instruction, which can be of either scalar or vector type. Scalar and vector instructions are intermixed in the same program. Vector instructions are executed in SIMD mode (single instruction-multiple-data). Both the scalar and the vector processor are pipelined. This processor should be easy to implement in a 0.18 micron CMOS technology.

The scalar instructions include:
ADD
SUB
AND
OR
XOR
LSHIFT
RSHIFT
JMP
BEQ
BNE
LDI
LOAD
STORE The vector instructions include:
VADD vector add
VSUB vector subtract
VMUL vector multiply
VMADD vector multiply-add
VSHIFT
VAND
VOR
VXOR
VLOAD
VSTORE The data path of the scalar processor is 32-bit wide. The data path of the vector processor is 16-bit wide (or the width of the A/D word).

Figure 4:
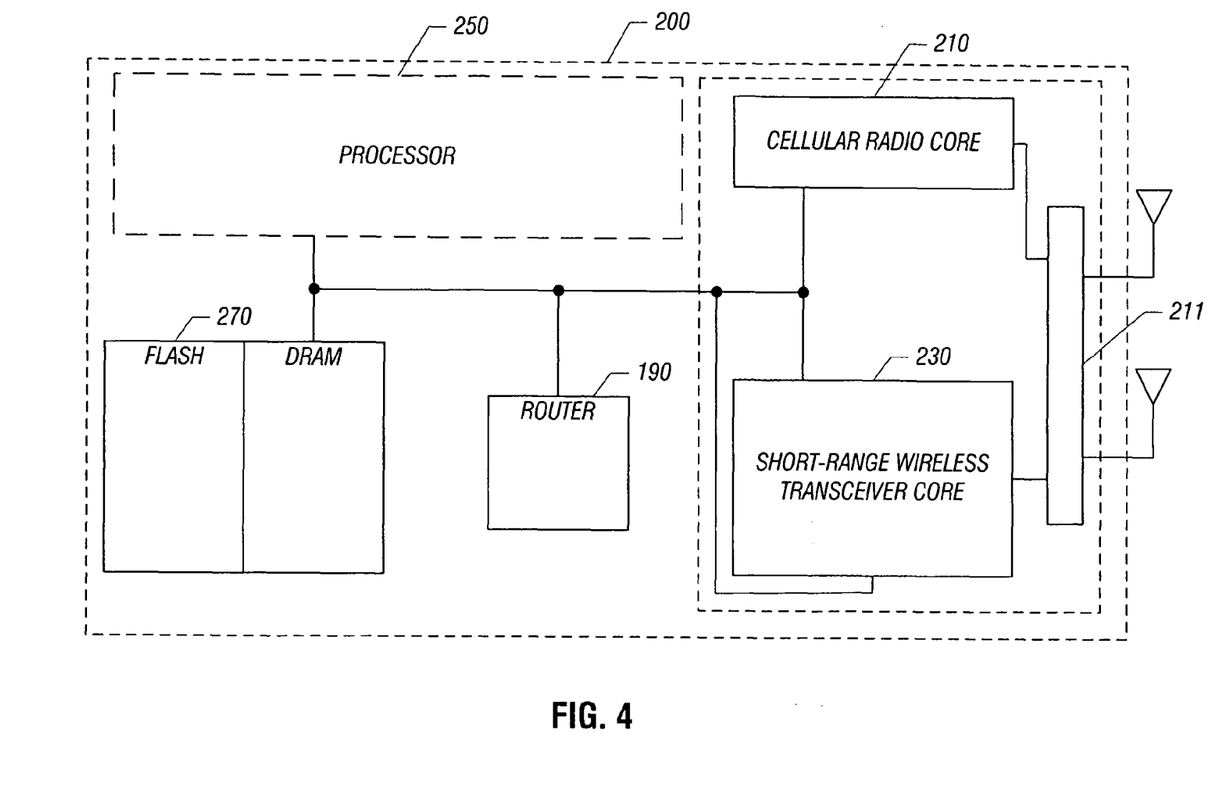
FIG. 4 is a block diagram of a system in accordance with one embodiment of the present invention.

In one implementation as shown in FIG. 4, the processor of FIG. 1 (reference numeral 250) is implemented in an integrated CMOS device 200 with radio frequency (RF) circuits, including a cellular radio core 210, a short-range wireless transceiver core 230, and a sniffer 211, along side digital circuits, including a reconfigurable processor 250 (such as the core of FIG. 1), a high-density memory array core 270, and a router 190. The high-density memory array core can include various memory technologies such as flash memory and dynamic random access memory (DRAM), among others, on different portions of the memory array core.

In another implementation, a 'pipeline' architecture is achieved by linking the processors in series and performing differing operations on each (this is more suitable for processing GPRS data) and then switching to a parallel implementation for high-speed standards. The general-purpose cores have a granular control over clock speeds, which can be multiples of the master clock to achieve synchronous operation to allow precise control over the processors.

Additionally, dedicated hardware can be provided to handle specific algorithms more efficiently than the processing cores. The number of active processors is controlled depending on the application, so that power is not used when it is not needed. This embodiment does not rely on complex clock control methods to conserve power, since the individual clocks are not run at high speed, but rather the unused processor is simply turned off when not needed.

Through the router, the multi-mode wireless communicator device can detect and communicate with any wireless system it encounters at a given frequency. The router performs the switch in real time through an engine that keeps track of the addresses of where the packets are going. The router can send packets in parallel through two or more separate pathways. For example, if a Bluetooth™ connection is established, the router knows which address it is looking at and will be able to immediately route packets using another connection standard. In doing this operation, the router working with the RF sniffer periodically scans its radio environment ('ping') to decide on optimal transmission medium. The router can send some packets in parallel through both the primary and secondary communication channel to make sure some of the packets arrive at their destinations.

The processor controls the cellular radio core and the short-range wireless transceiver core to provide a seamless dual-mode network integrated circuit that operates with a plurality of distinct and unrelated communications standards and protocols such as Global System for Mobile Communications (GSM), General Packet Radio Service (GPRS), Enhance Data Rates for GSM Evolution (Edge) and Bluetooth™. The cell phone core provides wide area network (WAN) access, while the short-range wireless transceiver core supports local area network (LAN) access. The reconfigurable processor core has embedded read-only-memory (ROM) containing software such as IEEE802.11, GSM, GPRS, Edge, and/or Bluetooth™ protocol software, among others.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. An apparatus, comprising:
a scalar computation unit configured to execute control software to process data packets for transmission via a wireless protocol, wherein the control software includes scalar instructions, vector instructions, and a plurality of function calls respectively corresponding to a plurality of digital signal processing functions;
a vector co-processor coupled to the scalar computation unit; and
a plurality of dedicated hardware engines configured to perform respective ones of the plurality of digital signal processing functions;
wherein the scalar computation unit is configured to:
perform scalar instructions included in the control software;
cause the vector co-processor to perform vector instructions included in the control software; and
cause at least first and second dedicated hardware engines of the plurality of dedicated hardware engines to perform digital signal processing functions corresponding to ones of the plurality of function calls included in the control software and subsequently send information to one or both of the scalar computation unit and the vector co-processor, wherein the first dedicated hardware engine is different from the second dedicated hardware engine, and wherein the first and the second dedicated hardware engines are selected from the group consisting of:
a convolutional decoding engine, a modulation engine, a transform engine, an error correction engine, and a cryptographic engine.

2. The apparatus of claim 1, further comprising:
a switch fabric coupled to the scalar computation unit, the vector co-processor, and the plurality of dedicated hardware engines;
wherein the apparatus is configured to be reconfigured, using the switch fabric, to process data packets for transmission via at least two different wireless protocols.

3. The apparatus of claim 1,
wherein the scalar computation unit is configured to provide configuration and parametric settings to the plurality of dedicated hardware engines at a beginning of a computation sequence, wherein the vector co-processor is configured to perform parallel computational operations, and wherein the plurality of dedicated hardware engines comprise a plurality of application circuit hardware engines.

4. The apparatus of claim 1, wherein the apparatus is configured to process data packets for transmission via at least two different wireless protocols, including a cellular radio protocol and a short-range wireless protocol.

5. The apparatus of claim 1, further comprising a clock coupled to the vector co-processor and each of the plurality of dedicated hardware engines, wherein the clock is configured to operate at a frequency scaled from a baseline crystal frequency to a maximum operating frequency.

6. The apparatus of claim 1, wherein at least one of the plurality of dedicated hardware engines is configured to perform a Gaussian filter operation.

7. The apparatus of claim 1, wherein one or more of the plurality of dedicated hardware engines are configured to be re-used from a first wireless protocol to a second wireless protocol by changing input parameters and a clock frequency.

8. The apparatus of claim 1, wherein the plurality of dedicated hardware engines includes an orthogonal frequency division multiplexing (OFDM) engine and a gaussian minimum shift keying (GMSK) engine.

9. The apparatus of claim 1, wherein the first dedicated hardware engine is a transform engine and the second dedicated hardware engine is an error correction engine.

10. The apparatus of claim 1, further comprising a memory coupled to the scalar computation unit and the vector co-processor, wherein the memory is configured for storing the control software such that the scalar instructions and the vector instructions are intermixed.

11. The apparatus of claim 1 further comprising a memory coupled to the scalar computation unit and the vector co-processor, the memory for storing instructions executable by the apparatus to cause the apparatus to disable one or more of the plurality of dedicated hardware engines without disabling remaining ones of the plurality of dedicated hardware engines.

12. The apparatus of claim 9, wherein the transform engine is an FHT engine and the error correction engine is a CRC engine.

13. The apparatus of claim 1, wherein the apparatus is configured to communicate one or more of the data packets in parallel via at least two different wireless protocols.

14. A wireless device, comprising:
an analog portion, including:
a radio frequency (RF) front-end configured to receive an RF signal from an antenna; and
an analog to digital converter (ADC) coupled to the RF front-end to digitize the RF signal; and
a digital portion, including:
a processor module, including:
a scalar computation unit configured to execute control software to process data packets for transmission via a wireless protocol, wherein the control software includes scalar instructions, vector instructions, and a plurality of function calls respectively corresponding to a plurality of digital signal processing functions;
a vector co-processor coupled to the scalar computation unit; and
a plurality of dedicated hardware engines configured to perform respective ones of the plurality of digital signal processing functions;
wherein the scalar computation unit is configured to:
perform scalar instructions included in the control software;
cause the vector co-processor to perform vector instructions included in the control software; and
cause at least first and second dedicated hardware engines of the plurality of dedicated hardware engines to perform digital signal processing functions corresponding to ones of the plurality of function calls included in the control software and subsequently send information to one or both of the scalar computation unit and the vector co-processor, wherein the first dedicated hardware engine is different from the second dedicated hardware engine, and wherein the first and the second dedicated hardware engines are selected from the group consisting of:
a convolutional decoding engine, a modulation engine, a transform engine, an error correction engine, and a cryptographic engine.

15. The wireless device of claim 14, further comprising a cellular radio core and a short-range wireless transceiver core both coupled to the processor module, wherein the processor module is configured to process data packets for transmission via at least two different wireless protocols, wherein the cellular radio core is associated with a first of the at least two different wireless protocols, and wherein the short-range wireless transceiver core is associated with a second of the at least two different wireless protocols.

16. The wireless device of claim 14, wherein the first dedicated hardware engine is a modulation engine and the second dedicated hardware engine is a cryptographic engine.

17. The wireless device of claim 14, wherein the processor module further comprises a switch fabric coupled to the scalar computation unit, to the vector co-processor, and to the plurality of dedicated hardware engines, and wherein the processor module is configured to be reconfigurable, using the switch fabric, to process data packets for transmission via at least two different wireless protocols.

18. The wireless device of claim 14, wherein the scalar computation unit is configured to provide configuration and parametric settings to the plurality of dedicated hardware engines at a beginning of a computation sequence, wherein the vector co-processor is configured to perform parallel computational operations, and wherein the plurality of dedicated hardware engines comprise a plurality of application circuit hardware engines.

19. The wireless device of claim 14, wherein the processor module further includes a memory coupled to the scalar computation unit and the vector co-processor, the memory for storing instructions executable by the processor module to disable one or more engines of the plurality of dedicated hardware engines without disabling remaining ones of the plurality of dedicated hardware engines.

20. The wireless device of claim 16, wherein the modulation engine is an OFDM engine and the cryptographic engine is an AES engine.

21. The wireless device of claim 14, wherein the processor is configured to communicate one or more of the data packets in parallel via at least two different wireless protocols.

22. An apparatus, comprising:
 first means for executing instructions to generate:
  instructions for performance of a plurality of vector operations; and
  a plurality of function calls;
 second means for performing the plurality vector operations; and
 third means for performing, responsive to the plurality of function calls, a plurality of different digital signal processing functions, the third means including a plurality of dedicated engines;
 wherein the apparatus is configured to send data packets via a wireless protocol by causing:
  the second means to execute the plurality of vector operations; and
  the third means to execute the plurality of function calls and subsequently send information to the processor module, wherein executing the plurality of function calls includes causing at least first and second dedicated engines of the plurality of dedicated engines to perform digital signal processing functions corresponding to ones of the plurality of function calls, wherein the first dedicated engine is different from the second dedicated engine, and wherein the first and the second dedicated engines are selected from the group consisting of:
   a convolutional decoding engine, a modulation engine, a transform engine, an error correction engine, and a cryptographic engine.

* * * * *

UNITED STATES PATENT AND TRADEMARK OFFICE
CERTIFICATE OF CORRECTION

PATENT NO. : 8,090,928 B2  
APPLICATION NO. : 10/184402  
DATED : January 3, 2012  
INVENTOR(S) : Schmidt et al.

Page 1 of 1

It is certified that error appears in the above-identified patent and that said Letters Patent is hereby corrected as shown below:

On the Face Page, in the Figure, delete "  " and insert --  --, therefor.

In Fig. 1, Sheet 1 of 4, delete "  " and insert --  --, therefor.

In Column 3, Line 44, delete "circuit-device." and insert -- circuit device. --, therefor.

In Column 4, Line 5, delete "DESCRIPTION" and insert -- DETAILED DESCRIPTION --, therefor.

In Column 5, Line 19, delete "a an" and insert -- an --, therefor.

In Column 8, Line 11, in Claim 11, delete "1" and insert -- 1, --, therefor.

Signed and Sealed this  
Fourteenth Day of August, 2012

David J. Kappos  
*Director of the United States Patent and Trademark Office*